US010050556B2

(12) United States Patent
Chivite Zabalza et al.

(10) Patent No.: US 10,050,556 B2
(45) Date of Patent: Aug. 14, 2018

(54) VOLTAGE SOURCE CONVERTER AND CONTROL THEREOF

(71) Applicant: General Electric Technology GmbH, Baden (CH)

(72) Inventors: Francisco Javier Chivite Zabalza, Stafford (GB); Francisco Moreno Munoz, Navarra (GB); David Reginald Trainer, Derby (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/553,243

(22) PCT Filed: Feb. 19, 2016

(86) PCT No.: PCT/EP2016/053611
§ 371 (c)(1),
(2) Date: Aug. 24, 2017

(87) PCT Pub. No.: WO2016/135067
PCT Pub. Date: Sep. 1, 2016

(65) Prior Publication Data
US 2018/0034382 A1    Feb. 1, 2018

(30) Foreign Application Priority Data
Feb. 27, 2015  (EP) ..................... 15156907

(51) Int. Cl.
*H02M 7/217*    (2006.01)
*H02M 1/08*    (2006.01)
(Continued)

(52) U.S. Cl.
CPC ............. *H02M 7/217* (2013.01); *H02M 1/08* (2013.01); *H02J 3/36* (2013.01); *H02M 2001/0054* (2013.01)

(58) Field of Classification Search
CPC ........ H02M 1/08; H02M 1/32; H02M 5/4585; H02M 7/49; H02M 7/217; H02M 2001/0054; H02M 2007/4835
See application file for complete search history.

(56) References Cited

U.S. PATENT DOCUMENTS

| | | | |
|---|---|---|---|
| 8,570,779 B2 * | 10/2013 | Dommaschk | H02M 1/32 361/57 |
| 9,755,497 B2 * | 9/2017 | Townsend | H02M 1/084 |

(Continued)

FOREIGN PATENT DOCUMENTS

| | | |
|---|---|---|
| WO | 2010/149200 A1 | 12/2010 |
| WO | 2012/055435 A1 | 5/2012 |

OTHER PUBLICATIONS

Merlin, M. M. C. et al., "The alternate arm converter: A new hybrid multilevel converter with DC-fault blocking capability," IEEE Transactions on Power Delivery, vol. 29, Issue 1, pp. 310-317, (Feb. 2014).

(Continued)

*Primary Examiner* — Yusef A Ahmed
(74) *Attorney, Agent, or Firm* — GE Global Patent Operation; Scott R. Stanley

(57) ABSTRACT

Methods and apparatus for hard switching of Alternate-Arm-Converter voltage source converters. Such voltage source converters have a phase limb with a high and low side converter arm connecting an AC terminal to a high and low side DC terminal, respectively, including a chain-link circuit in series with a director switch. Each chain-link circuit includes series connected cells that can be switched to generate a controlled voltage across the chain-link circuit. In embodiments, a controller turns-off the director switch of a converter arm that is conducting current in response to a hard-switching request for a first phase limb. In response to a hard-switching request, the controller controls the chain- (Continued)

link circuits of the first phase limb at any point in a phase cycle to control: a DC voltage across the director switch and/or the current flowing through the director switch to a predetermined level before turning the director switch off.

12 Claims, 6 Drawing Sheets

(51) Int. Cl.
  *H02M 1/00* (2006.01)
  *H02J 3/36* (2006.01)

(56) References Cited

U.S. PATENT DOCUMENTS

| | | | | |
|---|---|---|---|---|
| 2008/0232145 A1* | 9/2008 | Hiller | ............... | H02H 7/1225 363/56.01 |
| 2008/0259661 A1* | 10/2008 | Hiller | ............... | H02M 7/49 363/71 |
| 2011/0267852 A1* | 11/2011 | Asplund | ............... | H01H 39/004 363/55 |
| 2012/0127766 A1* | 5/2012 | Crookes | ............... | H02J 3/1857 363/126 |
| 2012/0147636 A1* | 6/2012 | Hiller | ............... | H02M 7/483 363/55 |
| 2012/0201059 A1* | 8/2012 | Berggren | ............... | H02H 7/268 363/53 |
| 2013/0128636 A1* | 5/2013 | Trainer | ............... | H02J 3/1857 363/65 |
| 2013/0279211 A1* | 10/2013 | Green | ............... | H02M 7/49 363/35 |
| 2013/0308235 A1* | 11/2013 | Davies | ............... | H02H 7/1257 361/62 |
| 2014/0146583 A1* | 5/2014 | Trainer | ............... | H02J 3/36 363/35 |
| 2014/0293656 A1* | 10/2014 | Trainer | ............... | H02M 3/335 363/15 |
| 2015/0003134 A1* | 1/2015 | Trainer | ............... | H02J 3/36 363/132 |
| 2015/0214840 A1* | 7/2015 | Acharya | ............... | H02M 3/158 363/17 |
| 2015/0333660 A1* | 11/2015 | Kim | ............... | H02M 1/32 363/123 |
| 2016/0141876 A1* | 5/2016 | Oates | ............... | H02M 7/483 363/123 |
| 2016/0141969 A1* | 5/2016 | Trainer | ............... | H02J 3/02 363/37 |
| 2016/0365787 A1* | 12/2016 | Geske | ............... | H01T 1/14 |
| 2017/0187276 A1* | 6/2017 | Townsend | ............... | H02M 1/084 |
| 2017/0264187 A1* | 9/2017 | Lukasik | ............... | H02H 3/087 |

OTHER PUBLICATIONS

Extended European Search Report and Opinion issued in connection with corresponding EP Application No. 15156907.6 dated Sep. 15, 2015.
International Search Report and Written Opinion issued in connection with corresponding PCT Application No. PCT/EP2016/053611 dated May 17, 2016.

* cited by examiner

VOLTAGE SOURCE CONVERTER AND CONTROL THEREOF

FIELD OF INVENTION

This application relates to a voltage source converter and to methods and apparatus for control of a voltage source converter, and especially to a voltage source converter for use in high voltage power distribution and in particular to hard switching of a voltage source converter.

BACKGROUND OF THE INVENTION

HVDC (high-voltage direct current) electrical power transmission uses direct current for the transmission of electrical power. This is an alternative to alternating current electrical power transmission which is more common. There are a number of benefits to using HVDC electrical power transmission.

In order to use HVDC electrical power transmission, it is typically necessary to convert alternating current (AC) to direct current (DC) and back again. To date most HVDC transmission systems have been based on line commutated converters (LCCs), for example such as a six-pulse bridge converter using thyristor valves. LCCs use elements such as thyristors that can be turned on by appropriate trigger signals and remain conducting as long as they are forward biased. In LCCs the converter relies on the connected AC voltage to provide commutation from one valve to another.

Increasingly however voltage source converters (VSCs) are being proposed for use in HVDC transmission. HVDCs use switching elements such as insulated-gate bipolar transistors (IGBTs) that can be controllably turned on and turned off independently of any connected AC system. VSCs are thus sometime referred to as self-commutating converters.

VSCs typically comprise multiple converter arms, each of which connects one DC terminal to one AC terminal. For a typical three phase AC input/output there are six converter arms, with the two arms connecting a given AC terminal to the high and low DC terminals respectively forming a phase limb. Each converter arm comprises an apparatus which is commonly termed a valve and which typically comprises a plurality of elements which may be switched in a desired sequence.

In one form of known VSC, often referred to as a six pulse bridge, each valve comprises a set of series connected switching elements, typically insulated gate bipolar transistors (IGBTs) connected with respective antiparallel diodes. The IGBTs of the valve are switched together to electrically connect or disconnect the relevant AC and DC terminals, with the valves of a given phase limb typically being switched in anti-phase. By using a pulse width modulated (PWM) type switching scheme for each arm, conversion between AC and DC voltage can be achieved.

In high voltage applications where a large number of series connected IGBTs are required the approach does however require complex drive circuitry to ensure that the IGBTs switch at the same time as one another and requires large passive snubber components to ensure that the high voltage across the series connected IGBTs is shared correctly. In addition the IGBTs need to switch on and off several times over each cycle of the AC voltage frequency to control the harmonic currents. These factors can lead to relatively high losses in conversion, high levels of electromagnetic interference and a complex design.

In another known type of VSC, referred to as a modular multilevel converter (MMC), each valve comprises a plurality of cells connected in series, each cell comprising an energy storage element such as a capacitor and a switch arrangement that can be controlled so as to either connect the energy storage element between the terminals of the cell or bypass the energy storage element. The cells are sometimes referred to as sub-modules, with a plurality of cells forming a module. The sub-modules of a valve are controlled to connect or bypass their respective energy storage elements at different times so as to vary over the time the voltage difference across the plurality of cells. By using a relatively large number of sub-modules and timing the switching appropriately the valve can synthesise a stepped waveform that approximates to a desired waveform, such as a sine wave, to convert from DC to AC or vice versa with low levels of harmonic distortion. As the various sub-modules are switched individually and the changes in voltage from switching an individual sub-module are relatively small a number of the problems associated with the six pulse bridge converter are avoided.

In the MMC design each valve is operated continually through the AC cycle with the two valves of a phase limb being switched in synchronism to provide the desired voltage waveform.

Recently a variant converter has been proposed wherein a series of connected cells is provided in a converter arm for providing a stepped voltage waveform as described, but each converter arm is turned off for at least part of the AC cycle. Thus the plurality of series connected cells for voltage wave-shaping are connected in series with switching elements which can be turned off when the relevant converter arm is in the off state and not conducting. Such a converter has been referred to as an Alternate-Arm-Converter (AAC). An example of such a converter is described in WO2010/149200.

FIG. 1 illustrates a known Alternate-Arm-Converter (AAC) 100. The example converter 100 has three phase limbs 101a-c, each phase limb having a high side converter arm connecting the relevant AC terminal 102a-c to the high side DC terminal DC+ and a low side converter arm connecting the relevant AC terminal 102a-c to the low side DC terminal DC−. Each converter arm comprises a circuit arrangement 103 of series connected cells, the arrangement 103 being in series with an arm switch 104 and inductances 105. It will be noted that FIG. 1 illustrates a single arm inductance but one skilled in the art will appreciated that the arm inductance may in practice be distributed along the arm between the AC and DC terminals.

The circuit arrangement 103 comprises a plurality of cells 106 connected in series. Each cell 106 has an energy storage element that can be selectively connected in series between the terminals of the cell or bypassed. In the example shown in FIG. 1 each cell 106 has terminals 107a, 107b for high-side and low-side connections respectively and comprises a capacitor 108 as an energy storage element. The capacitor 108 is connected with cell switching elements 109, e.g. IGBTs with antiparallel diodes, to allow the terminals 107a and 107b of the cell to be connected via a path that bypasses capacitor 108 or via a path that includes capacitor 108 connected in series. In the example illustrated in FIG. 1 each cell comprises four cell switching elements 109 in a full H-bridge arrangement such that the capacitor can be connected in use to provide either a positive or a negative voltage difference between the terminals 107a and 107b. In some embodiments however at least some of the cells may comprise switching elements in a half bridge arrangement such that the capacitor can be bypassed or connected to provide a voltage difference of a given polarity. The circuit arrangement 103 of such series connected cells can thus operate to provide a voltage level that can be varied over time to provide stepped voltage waveform for wave-shaping as discussed above. The circuit arrangement 103 is sometimes referred to as a chain-link circuit or chain-link converter or simply as a chain-link. In this disclosure the circuit arrangement 103 of such series connected cell for providing a controlled voltage shall be referred to as a chain-link.

In the AAC converter the chain-link 103 in each converter arm is connected in series with an arm switch 104, which will be referred to herein as a director switch, which may comprise a plurality of series connected arm switching elements 110. The director switch of an arm may for example comprise high voltage elements with turn-off capability such as IGBTs or the like with antiparallel diodes. When a particular converter arm is conducting, the chain-link 103 is switched in sequence to provide a desired waveform in a similar fashion as described above with respect to the MMC type converter. However in the AAC converter each of the converter arms of a phase limb is switched off for part of the AC cycle and during such a period the director switch 104 is turned off.

For example, the director switch of the high side arm of a phase limb may be switched on to be conducting during the positive half of the relevant AC cycle and switched off to be non-conducting during the negative half of the cycle, with the low side director switch being switched in antiphase. During the positive half of the cycle the chain-link 103 of the high side arm is switched in a sequence to provide desired wave-shaping. During the negative half of the cycle the chain-link 103 of the low side arm provides wave-shaping. In such a mode of operation there may be no or only a limited amount of overlap between periods of conduction of the director switches 104 of the high side and the low side.

In some modes of operation, referred to as an overlap mode of operation, the director switch of the high side may be conducting, with the chain-link 103 of the high side arm providing wave-shaping, for part of the negative cycle, e.g. for a certain phase angle before and after the positive half of the cycle. Likewise the director switch of the low side may be conducting, with the chain-link 103 of the low side arm providing wave-shaping, for part of the positive cycle. There is thus an extended period of overlap when the director switches of both arms are on. Such a mode of operation does require the chain-links 103 of each converter arm to be able to generate a voltage greater than half the total DC voltage of the VSC. In the overlap period the full DC voltage is supported by both the low-side and top-side chain-links, in other words the sum of the voltages of both chain-links equals the total DC voltage, although it will be understood that the chain-links may instantaneously be providing different voltages to one another.

It will be understood that in normal operation the director switches 104 are turned off at a point when there is no current flowing through the switch and also with no voltage difference across the switch. For example as mentioned the high side director switch may be turned off at the end of the positive half of the AC cycle when the current has dropped to zero and the chain-link 103 provides a voltage equal to the voltage magnitude of the high side DC terminal so that there is no voltage difference across the arm switch. In the overlap mode of operation the high side director switch is turned off during the negative part of the cycle when the current is flowing via the low side director switch. Similar considerations apply to the low side arm.

In some instances however it may be necessary to turn a director switch of a converter off at a point at which it is conducting significant current. This is known as hard switching. This could be for instance due to some abnormal operating conditions such as those caused by grid fault.

In a hard switching event therefore the switching elements 110 of the director switch 104 are commanded to open whilst there is current flowing through the director switch. This results in a rapid drop of current through the relevant converter arm, with an equally rapid rise in current through the other converter arm of the phase limb.

These rapid ramps in current will induce a voltage in the arm inductances 105, the magnitude of which is related to the arm inductance values and the magnitude of the current, as well as the rate of change. This induced voltage can lead to a voltage stress on the arm switching elements and potentially an overvoltage on the arm switching elements 110, e.g. the IGBTs. In some instances, the collector to emitter voltage VCE could reach fault-level values outside the Safe Operating Area (SOA) that could potentially destroy them. Moreover, the dynamic voltage sharing amongst all switching elements 110 forming the director switch 104 may not be equal, due to mismatches in the device characteristics and different propagation and delay times. Consequently, not only the voltage across the complete director switch could exceed the safe limits of operation, but also, some of the devices could take a higher share of that voltage.

Embodiments of the invention are directed at methods and apparatus for the control of a VSC that at least mitigate at least some of the issues noted above.

Thus according to the present invention there is provided a voltage source converter comprising: at least one phase limb comprising a high side converter arm connecting an AC terminal to a high side DC terminal and a low side converter arm connecting the AC terminal to a low side DC terminal; wherein each of the converter arms comprises a chain-link circuit in series with a director switch; wherein each chain-link circuit comprises a plurality of series connected cells that can be controllably switched to generate a controlled voltage across the chain-link circuit; and a controller configured to turn-off the director switch of a converter arm that is conducting current in response to a hard-switching request for a first phase limb; wherein, in response to a hard-switching request, the controller is configured to control the chain-link circuits of the first phase limb, at any point in a phase cycle, to control at least one of: a DC voltage across the director switch; and the current flowing through the director switch to a predetermined level before turning the director switch off.

Embodiments of the invention thus relate to a voltage source converter (VSC) of the Alternate-Arm-Converter (AAC) type having a controller for controlling hard switching of the VSC. In response to a hard switching request, i.e. a command to turn off the director switch of a converter arm that is conducting current, the controller controls the chain-link circuits of the phase limb so as to reduce at least one of the DC voltage across the director switch or the current flowing through the director switch before it is turned off. As will be explained in more detail below the DC voltage across the director switch is the component of the DC voltage between the DC terminals that would be experienced across the director switch if it were off. As will be explained in more detail later by reducing the DC voltage across the director switch and/or the current flowing through the switch before it is turned off, the voltage stresses experienced by the director switch as it turns off can be significantly reduced. It has been recognised that the chain-link circuits of the phase limb are controllable circuits that can be controlled relatively quickly in a hard switching event to reduce the voltage stresses on the director switch.

In some embodiments the predetermined level may substantially zero DC voltage and/or substantially zero current. In some embodiments however the predetermined level may be a relatively small non-zero voltage and/or current. The reference to controlling the DC voltage or current to the predetermined level shall be understood to mean controlling the voltage or current to be substantially no greater than the predetermined level. It shall also be understood that there may in some embodiments be different predetermined levels for voltage and for current.

In some embodiments the controller may be configured to control the chain-link circuits such that the combined voltage of the chain-link circuits of the first phase limb is equal to the DC voltage between the high side DC terminal and the low side DC terminal prior to turning the director switch off. In this way the chain-link circuits of the high side and low side arms offset the whole DC voltage and as a result there is no component to any voltage stress on the director switch as it opens that arises from the phase limb DC voltage.

The controller may be configured to determine whether the first phase limb is in an overlap state with the director switches of both converter arms on. In an overlap state the combined voltages of the high side and low side chain-link circuits will typically already be equal to the DC voltage and no further control may be needed. However if, the first phase limb is not in an overlap state, the controller may vary the voltage of at least one of the chain-link circuits, which may for example be the chain-link circuit of the converter arm that is conducting current.

In some embodiments the controller may configured to determine whether the first phase limb is within a predetermined time or phase angle of an overlap state, i.e. a certain time or phase angle before or after the start or end of an overlap period. If so the controller may be configured to control the chain-link circuits to start the overlap state early or extend the overlap state as appropriate. This can offset or eliminate any DC component on the director switch as it opens in way that reduces or minimises any disturbance of the AC voltage.

In some embodiments the controller may be further configured to control the voltage source converter to reduce the DC voltage between the high side DC terminal and the low side DC terminal period to turning the director switch off. This can make it easier for the chain-links to minimise the voltage stresses on the director switch subject to hard switching.

The controller may, in some embodiments, be further configured to control the chain-link circuits such that the combined voltage of the chain-link circuits of the first phase limb is stepped up for a period during turn-off of the director switch to at least partly counteract any voltage across the director switch due to induced voltages in inductances of the converter arms of the first phase limb. The combined voltage may be stepped up by an amount corresponding to (LARM++LARM−)·IP/tfall wherein LARM+ and LARM− are the inductance values of the high side and low side converter arm inductances respectively, IP is the current through the converter arm of the first phase limb prior to turning the director switch off and tfall is a predetermined time period related to the turn-off time of the director switch. The stepped-up voltage may be applied at a time to correspond to a ramp in current in the director switch as it turns off. In this embodiment it may be possible to ensure that there is substantially zero voltage stress on the director switch as it opens.

In some embodiments the controller may be further configured to control the voltage source converter to vary a modulation scheme for harmonic control prior to turning the director switch off. As will be described in more detail below in some embodiment modulations schemes, especially for controlling the harmonics, e.g. tripplen harmonic injection, may result in an increased voltage stress on a director switch during hard switching. The controller may therefore disable or modify such schemes during hard switching to mitigate such detrimental effects or even to provide a benefit.

In some embodiments the controller may configured to control the chain-link circuits to block the chain-link circuit in the converter arm that is conducting current before turning the director switch off. Blocking the chain-link circuit may comprise turning all of the switching elements of at least some of the cells of the chain-link circuit so as to introduce an energy storage element of the cell into the phase arm for charging.

Blocking the chain-link circuits can effectively cancel or reduce the DC voltage component across the director switch. Thus in some embodiments the chain-link circuit of the converter arm can be switched to a blocked state and then the director switch opening with the DC voltage across the switch as it opens being effectively zero.

In some embodiments the controller may be configured to control the chain-link circuits to reduce the arm current to the predetermined level before turning the director switch off.

In some embodiments the controller may configured to control the chain-link circuits to block the chain-link circuit in the converter arm that is conducting current in order to reduce the arm current to the predetermined level. As mentioned above blocking the chain-link circuit may comprise turning all of the switching elements of at least some of the cells of the chain-link circuit so as to introduce an energy storage element of the cell into the phase arm for charging. This causes the arm current to reduce when the director switch is still conducting and thus no significant voltage stress develops across the switch.

In other embodiments however the controller may be configured to control the chain-link circuits such that at least the chain-link circuit in the arm conducting current provides a voltage level that reduces the arm current. Thus, rather than block the chain-link circuit, it may be controlled to provide a voltage that results in a reduction of the arm current.

However the chain-link circuits are controlled to reduce the arm current, after the arm current has reached the predetermined level the director switch may be opened, i.e. turned off. In some embodiments however the controller may be configured such that, after the current has dropped to the predetermined level, control the chain-link circuits such that the combined voltage of the chain-link circuits of the first phase limb is equal to the DC voltage between the high side DC terminal and the low side DC terminal prior to turning the director switch off.

The controller of the VSC may be implemented by one or more modules that may comprise hardware or software or a combination of both.

The voltage source converter may form part of an HVDC power transmission or distribution network and another aspect of the invention relates to an HVDC power transmission or distribution network comprising a VSC as described above.

The invention also relates to a method of controlling a VSC. Thus in another aspect there is provided a method of controlling a voltage source converter having at least one phase limb comprising a high side converter arm connecting an AC terminal to a high side DC terminal and a low side converter arm connecting the AC terminal to a low side DC terminal; each of the converter arms comprising a chain-link circuit in series with a director switch, wherein each chain-link circuit comprises a plurality of series connected cells that can be controllably switched to generate a controlled voltage across the chain-link circuit. The method comprises: in response to a hard-switching request for a first phase limb at any point in a phase cycle, controlling the chain-link circuits of the first phase limb to control at least one of: a DC voltage across the director switch; and the current flowing through the director switch to a predetermined level; and subsequently turning the director switch off.

The method according to this aspect of the invention provides all of the same benefits and may be implemented in any of the variants as discussed above in relation to the first aspect of the invention.

In particular in some examples controlling the chain-link circuits of the first phase limb may comprise controlling the voltages of chain-link circuits such that the combined voltage of the chain-link circuits of the first phase limb is equal to the DC voltage between the high side DC terminal and the low side DC terminal prior to turning the director switch off. Additionally or alternatively in some examples controlling the chain-link circuits of the first phase limb may comprise blocking the chain-link circuit in the converter arm of the first phase limb that is conducting before turning the director switch off. In some examples controlling the chain-link circuits of the first phase limb may comprise controlling at least the chain-link circuit in the converter arm of the first phase limb that is conducting current to reduce the arm current to the predetermined level before turning the director switch off.

Aspects of the invention also relate to machine readable instructions, such as software code, comprising instructions for causing a suitable apparatus, such as a processor or controller of a VSC, to operate the methods described. The machine readable instructions may be stored on a non-transitory storage medium such as a memory of some sort.

In a further aspect the invention also relates to a controller of a VSC having: at least one phase limb comprising a high side converter arm connecting an AC terminal to a high side DC terminal and a low side converter arm connecting the AC terminal to a low side DC terminal; wherein each of the converter arms comprises a chain-link circuit in series with a director switch; wherein each chain-link circuit comprises a plurality of series connected cells that can be controllably switched to generate a controlled voltage across the chain-link circuit.

The controller is configured to turn-off the director switch of a converter arm that is conducting current in response to a hard-switching request for a first phase limb; wherein, in response to a hard-switching request, the controller is configured to control the chain-link circuits of the first phase limb, at any point in a phase cycle, to control at least one of: a DC voltage across the director switch; and the current flowing through the director switch to a predetermined level before turning the director switch off.

BRIEF DESCRIPTION OF THE DRAWINGS

To further explain the invention and the benefits and advantages thereof, the invention will now be described by way of example only with reference to the accompanying drawings, of which.

DETAILED DESCRIPTION OF THE INVENTION

As mentioned above hard switching involves initiating turn-off of the director or arm switch of a converter arm at a point in the cycle when it is conducting current. With conventional hard switching this could, in some instances, lead to an over-voltage on the switching elements of the director switch.

Figure 1:
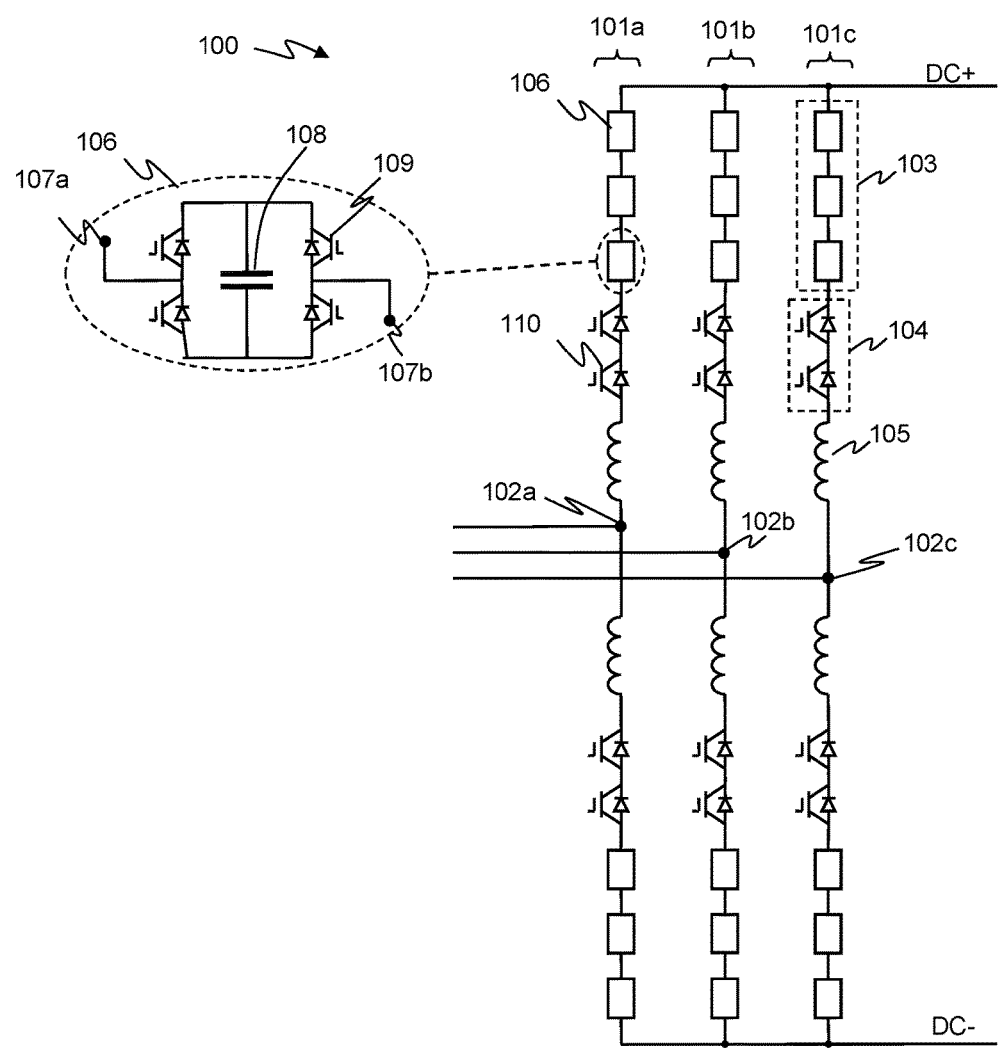
FIG. 1 illustrates a known type of Alternate Arm Converter (AAC)
Figure 2:
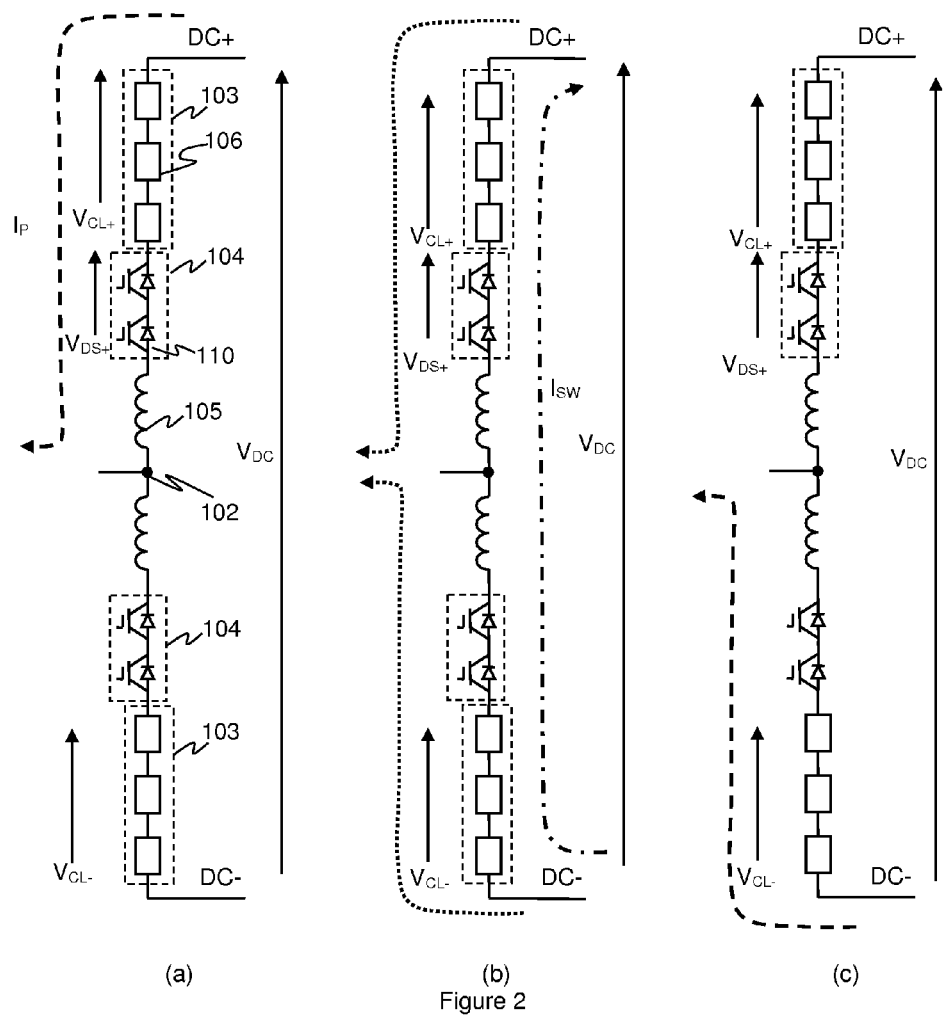
FIG. 2 illustrates how current flow may vary during a hard switching event.

FIG. 2 illustrates how current flow may vary in a phase limb in a hard switching event. FIG. 2 illustrates a single phase limb of a voltage source converter (VSC) of the Alternative Arm Converter (AAC) type such as illustrated in FIG. 1. In FIG. 2 similar components to those shown in FIG. 1 are identified using the same reference numerals.

FIG. 2a illustrates the situation where the high side converter arm is conducting, with the high side director switch 104 being on or closed, and the low side director switch 104 off and non-conducting, e.g. as may be experienced in normal operation during at least some of the positive part of the AC cycle for the relevant phase. A phase current IP is flowing, which in this situation is flowing through the high side arm as indicated by the dotted line. The phase current will vary over the course of the AC cycle as will be well understood and thus FIG. 2a can be seen as showing the situation at a particular point in time.

If for some reason it becomes necessary to perform hard switching at this point then conventionally the high side director switch 104 would be turned off at this instant, whilst current is flowing through the high side converter arm. As the director switch 104 of the high side arm turns off the phase current through the high side arm would thus ramp down as the switching elements 110 of the director switch turn off. As the switching elements 110 turn off, the current through the high side arm will decrease over a time scale associated with the turn-off of the switching elements. Over this time scale the phase current will remain substantially constant and thus this current will start to be sourced via the low side converter arm, e.g. via the freewheeling diodes associated with the switching elements 110 of the low side director switch. Thus there will be a rapid ramp down in current through the high side converter arm and a corresponding rapid ramp up in current through the low side converter arm. FIG. 2b illustrates the situation during this period where a falling current is flowing through the high side converter arm and a rising current is flowing through the low side converter arm as illustrated by the dotted lines.

The rise of current through the bottom arm, and the falling of current through the top arm, can be represented by the circulation of a fictitious commutating or switching current, ISW.

Once the switching elements 110 of the high side director switch have turned completely off the phase current IP will be wholly flowing through the low side converter arm as illustrated in FIG. 2c.

During a hard switching event, in the period when the high side director switch is in the process of turning off, the ramp of current mentioned above will induce voltages in the arm inductances 105. In addition, once the director switch starts to turn off then any DC voltage component, i.e. any DC voltage difference that would exist between the terminals of the director switch when the director switch is off, will start to appear across the director switch. The DC voltage component will depend on the overall DC voltage across the phase limb and the voltage drops due to the chain-links of both converter arms. Thus, assuming that there are no snubber or switching aid circuits fitted in the switching elements of the director switch, the voltage across the high side director switch VDS+ will be:

$$V_{DS+} = V_{DC} - (V_{CL-} + V_{CL+}) + (L_{ARM-} + L_{ARM+})\frac{I_P}{t_{fall}} \quad \text{Eqn. (1)}$$

where VDC is the DC voltage level, VCL+ and VDC− are the voltages of the high and low side chain-links 103 respectively, LARM− and LARM+ are the values of the high and low side inductances respectively, IP is the phase current and tfall is the time for the switching elements to turn off.

Figure 3:
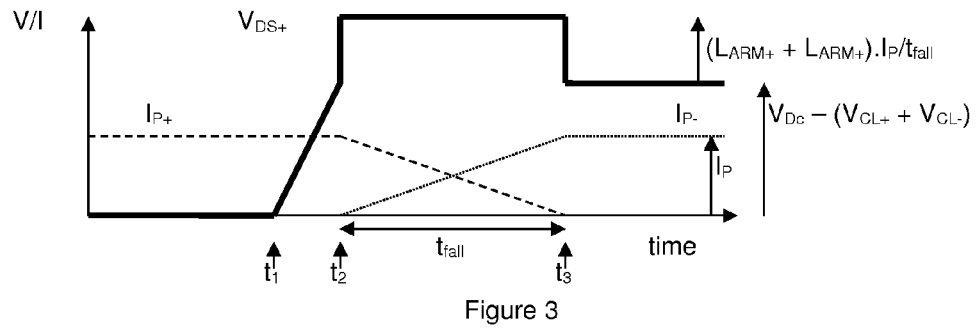
FIG. 3 illustrates how the voltages across a director switch may vary during a hard switching event for a conventional AAC.

FIG. 3 illustrates how the voltages may develop over time during a hard switching event according to conventional control of an AAC. Before time t1 the high side director switch is conducting and thus a phase current is flowing in the high side converter arm. The current through the high side arm is represented by the dashed line IP+. As the high side director switch is conducting then there is only a relatively low voltage drop across the director switch, i.e. the voltage across the high side director switch VDS+ is substantially zero.

At time t1 the turn-off process starts and the resistance of the high-side director switch starts to increase. At this point any component of DC voltage across the high side director switch starts to develop across the director switch (but at this point the switch is still allowing the phase current to flow). This DC component of voltage will be equal to the overall DC voltage VDC less the voltage drop over the high side and low side chain-links 103, which depend on the voltage levels of the chain-links at the time of hard switching. The DC voltage component is thus equal to the DC voltage VDC less the combined chain-link voltages VCL++VCL−.

In the example shown the hard-switch occurs during the positive part of the cycle when the high-side chain-link is providing wave-shaping and the low side arm is not conducting. The voltage of the high side chain-link cells 103, VCL+, will therefore depend on the relevant point in the AC cycle at which the hard switching occurs. The voltage, VCL−, across the low side chain-link would, at this point, typically be set to maintain the voltage across the director switch of the low side within acceptable levels and thus may typically be at least equal to the voltage magnitude of the low side DC terminal, e.g. VDC/2, or possibly greater in some instances.

At time t2 the director switch starts ramping down the current and thus the current through the high side converter arm IP+ starts ramping down. At the same time the current through the low side arm IP− starts ramping up. The high side current ramps down to zero at a time t3, where t3−t2=tfall. During this period the rapid change in current induces a voltage in the arm inductances with a polarity which adds to the voltage across the high side director switch.

After the high side current ramps to zero at time t3 the induced voltage ceases and the DC component, VDC− (VCL++VCL−) remains across the director switch.

Depending on the point in the AC cycle at which the hard switching occurs the voltage of the high side chain-link VCL− may be relatively low and/or the phase current may be relatively high. The induced voltage due to the rapid change in current may be relatively high and the combination of these voltages may result in a relatively significant overvoltage on the director switch.

Embodiments of the invention mitigate the problems of overvoltage in a hard switching event. In embodiments of the invention the series connected cells of the converter arms of a phase limb, i.e. the chain-link circuits, are controlled in a hard switching event so as to control, at any point in the phase cycle, at least one of: (1) the DC voltage across the director switch; and (2) the current through the director switch to be below a predetermined threshold. In some embodiments the predetermined threshold is substantially zero. In other words, in a hard switching event the chain-links of the phase limb are switched, at any point in the phase cycle, to substantially eliminate or minimise any DC voltage component across the relevant arm switch and/or to reduce the current in the phase limb. The chain-links may be switched accordingly before the order to turn the director switch off is issued.

In one embodiment the chain-link circuits are thus controlled to substantially eliminate any DC voltage component across the director switch. By any DC voltage component is meant a voltage across the director switch, when turned off, resulting from the DC voltage between the high side and low side DC terminals, i.e. VDC.

As mentioned above if hard switching is applied then the resulting voltage across the director switch will include a component equal to the DC voltage VDC less the voltages of the high side and low side chain-links VCL+ and VCL−. In this embodiment the chain-links are therefore switched in a hard switching event to ensure that VCL++VCL− add to substantially VDC at whatever point in the switching cycle that the hard switching occurs.

Figure 4:
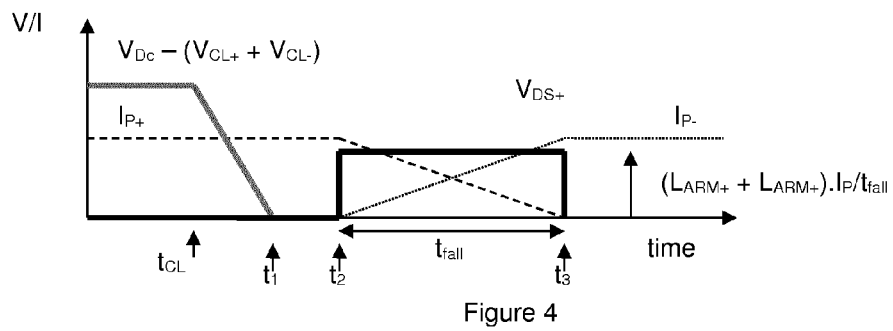
FIG. 4 illustrates how the voltages across a director switch may vary during a hard switching event in an embodiment of the invention.

FIG. 4 illustrates how the voltages may develop during hard switching in such an embodiment of the invention. FIG. 4 illustrates a hard switching event that occurs at substantially the same point in the phase cycle as discussed previously with respect to FIG. 3. In the example illustrated in FIG. 4 the director switch again starts to turn off at time t1 and the current ramp starts at t2 and finishes at time t3. However in this embodiment before the order to turn to the director switch is issued at or about t1 the high side and/or the low side chain-links are controlled, at a time tCL to ensure that they collectively provide a voltage that ensures that the DC voltage component across the director switch is no greater than a predetermined value. In one example the predetermined value is substantially zero. In other words the chain-link voltages may be controlled to ensure that:

$$VCL_+ + VCL_- = VDC \qquad \text{Eqn. (2)}$$

Thus at time t1 when the turn-off process starts there is no DC voltage component across the director switch and hence the voltage ramp illustrated in FIG. 3 at this point does not occur. The induced voltage due to the current ramp is still experienced during the period of current ramping, e.g. between t2 and t3 but the resultant voltage may be reduced compared to the situation illustrated in FIG. 3. The maximum voltage across the director switch, VDS, will be limited to:

$$VDS < (LARM_+ + LARM_-) \cdot IP/\text{tfall} \qquad \text{Eqn. (3)}$$

It should be noted that the discussion so far has assumed that the switching elements of the director switch, e.g. the IGBTs, do not have switching aid circuits fitted. In the case that switching aid circuits are present the switching sequence will depart from the general form discussed above, as will be appreciated by one skilled in the art, however, the same general principles apply and the reduction of the turn-off overvoltage is still significant in this case.

It will be appreciated that the condition of equation (2) will typically be met in normal operation of an AAC during a period of overlap, if the AAC is operating in overlap mode. Were a hard switching event to occur during such an overlap period of the AAC then no additional switching of the chain-links may be necessary. In this case the VSC controller may determine that the relevant phase limb is presently in overlap mode and the chain-links thus are already at the correct voltage levels and proceed with hard switching and issue the turn-off order for the relevant arm switch. However it will be appreciated that in embodiments of the invention the chain-links may be controlled to ensure that the condition of equation 2 is met whenever in the cycle the hard switching occurs. Thus in the event of hard switching being required outside of an overlap period a VSC controller may then determine that the chain-link voltages need to be adjusted to meet the condition of equation 2 and may thus control the chain-links prior to achieve the desired voltages prior to issuing a turn-off command.

Figure 5:
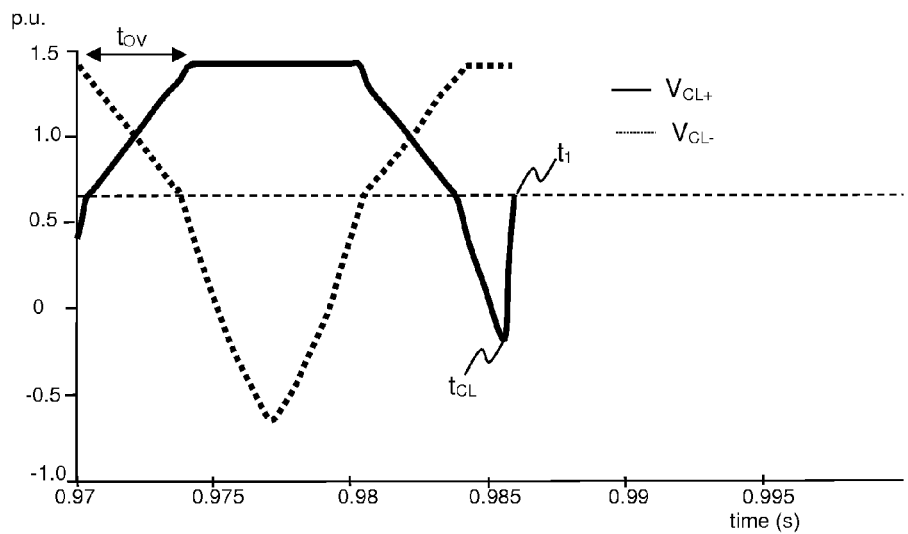
FIG. 5 illustrates how chain-link voltage may be controlled according to an embodiment of the invention.

FIG. 5 illustrates one example of how the chain-link voltages may be controlled. FIG. 5 illustrates how the high side chain-link voltage VCL+ (solid line) and the low side chain-link voltage VCL- (dotted line) may vary over the course of a cycle for a given phase limb. FIG. 5 illustrates an embodiment where the phase limb is operating in an overlap mode.

At the start of the period illustrated in FIG. 5 the voltage of the high side chain-link VCL+ is shown increasing as the voltage of the low side chain-link VCL- is decreasing. This corresponds to the end of the positive cycle and the start of the negative cycle. During a period of overlap, tOV, which corresponds to a period when both chain-link voltages are above the dashed line, the sum of the chain-link voltages equal the total DC voltage VDC. At a certain time, around 0.975 s in this example, the high side director switch is turned off and the voltage VCL+ of the high side chain-link is held constant, until the next overlap period starts. During this time the voltage of the low side chain-link is controlled to provide the desired wave shaping.

FIG. 5 illustrates that after the next overlap period the low side switch is turned off and the voltage VCL- of the low side chain-link is held constant. The voltage of the high side chain-link VCL+ is now varied to provide wave shaping. During this period a need for hard switching arises. At this point in the time the sum of the voltages of the two chain-links is less than the DC voltage. When the need for hard switching arises the normal control of the chain-links is interrupted and at a time tCL, which corresponds to the same tCL illustrated in FIG. 4, the chain-links are controlled to rapidly adopt a combined voltage equal to the DC voltage.

In some embodiments, this may involve changing the voltage level of just one of the chain-link voltages which may typically be the chain-link of the converter arm that is conducting at the time of the hard switching. For example as illustrated in FIG. 5 at the time that the hard switching occurs the low side chain-link voltage is already at its maximum voltage in normal operation, and thus it is the high side chain-link which is switched to increase its voltage level. However in some embodiments the voltage levels of both chain-links may be controllably varied in a hard switching event.

The voltages of the chain-links can be dynamically varied over a relatively short period of time and thus the time required to establish the required chain-link voltages does not significantly add to the time for the hard switching to be completed.

Changing the chain-link voltage, such as described with respect to FIG. 5, may result in a transient distortion of AC voltage. For an AAC which is operable in an overlap mode of operation the closer that the hard switching turn-off event is to an overlap period, the less distorted the VSC AC voltage will be.

In some embodiments therefore if there is a need for hard switching out of an overlap period but at a time that is relatively close to an overlap period, for instance within a predetermined time limit of an overlap period (whether before or after the relevant overlap period), then a VSC controller may operate to control the VSC so as to anticipate or extend the overlap period.

The VSC controller may thus receive or generate an indication that a hard switching event will or is likely to occur at a certain time instant or within a certain time window. There are various ways in which the occurrence of a hard switching event can be predicted and/or the likelihood of a hard switching event within a certain time window determined, as will be understood by one skilled in the art. If a hard switching event is predicted with a relatively high likelihood at a time instant or within a time window that is within a predetermined period of the start or end of an overlap period then the overlap may be anticipated or extended as discussed.

In some embodiments anticipating the overlap period, i.e. starting the overlap period earlier in the phase cycle than would normally be the case, could involve controlling the high and low side chain-links to jointly provide the full DC voltage and turning on the director switch of the presently non-conducting arm. In some embodiments this may involve a larger than normal step change in the voltage of the chain-link of the conducting arm. As mentioned in the overlap period the sum of the two chain-link voltages should be equal to the total DC voltage. However the maximum voltage of the chain-link in the non-conducting arm may be limited and thus there will be a minimum voltage required for the chain-link of the conducting arm in an overlap period, which may be greater than the normal voltage output of the chain-link at that part of the cycle.

For example consider a phase limb where the positive cycle runs from a phase angle of 0° to 180° and an overlap period normally starts at 150°. At this point the high side chain link would normally have a voltage VCL+ of 0.25 VDC and the low side chain-link would have a voltage VCL- of 0.75 VDC which may be the maximum voltage output of the low side chain-link. If the VSC controller determines that a hard switching event is likely in the period just before a phase angle of 150° then the overlap period may be started early. Before 150° however the voltage of the high side chain-link would normally be less than 0.25 VDC. As the maximum voltage output of the low side chain link is 0.75 VDC however it is necessary to step the voltage of the high side chain-link up to 0.25 VDC earlier than usual to ensure that the sum of the chain-link voltages is equal to the full DC voltage. These chain-link voltages may then be maintained at this level until the hard switching event occurs—or if the hard switching event actually does not occur until the normal start of the overlap period, e.g. a phase angle of 150°.

Of course if the maximum voltage output of the chain-link of the non-conducting arm were greater than the voltage required at the start of the normal overlap period and was sufficient to provide a voltage equal to the full DC voltage less the present voltage of the chain-link of the conducting arm then the overlap period could be started early purely be controlling to the voltage of the chain-link of the non conducting arm to the appropriate level and turning the director switch on.

Similar considerations apply to extension of the overlap period. If the overlap period is to be extended the voltages of the chain-links may be held at the same value they would normally have at the end of the overlap period or, if the chain-link of the non-conducting arm has sufficient voltage range the voltage of the chain-link of the conducting arm may continue to decrease with the voltage of the chain-link of the non-conducting arm being increased by a corresponding amount.

In either case if the hard switching event does then occur the director switch of the conducting arm may be turned off. The director switch of the non-conducting arm may also be turned off as part of the hard switching event, and may be turned off before or after or substantially at the same time as the director switch of the conducting arm. In some embodiments the director switch may be turned off in a staggered fashion with the various switching elements forming the director switch being turned off at different times.

As an addition or an alternative to considering extension or anticipation of an overlap period, a VSC controller may vary a control scheme applied to the VSC during a hard switching event of one phase limb. In some embodiments a modulation strategy may be applied to the VSC during normal operation that is beneficial for the AAC circuit operation, for example a control scheme directed to a particular way of harmonic control, for example tripplen harmonic injection. Such modulation strategies may, in normal operation, help alleviate the voltage burden across the chain-links at the expenses of increasing the voltage across the director switches—which could be detrimental during hard switching. Consequently, in some embodiments, during hard-switching a control scheme for tripplen harmonic injection can be temporarily suppressed. Alternatively, its magnitude could be minimized or even inverted to produce a beneficial effect for the director switches during the commutation process. Such harmonic injection should be equal in all three phases for the converter to operate correctly and thus in some embodiments a controller may operate so as to vary a control scheme for third harmonic injection applied to all phase limbs during hard switching of one phase limb. Varying the control scheme may comprise temporarily suspending the scheme or varying the magnitude, at least until the hard switching for the relevant phase limb is complete and the director switch is off.

Referring back to FIG. 5 the evolution of the voltage waveforms of the chain-link circuits after the director switch has turned will depend on the particular operation of the circuit at that time.

In general if both director switches are turned off after the hard switching event then the chain-links will continue to support the DC voltage. However if only one of the director switches remains open, for instance the hard switching occurred during an overlap period, then the chain-links may continue to produce whatever voltage waveform is demanded by the top-level VSC control.

The embodiments described above thus control at least one of the chain-links 103 of the converter arms of a phase limb to provide a voltage that ensures that the DC voltage component across a director switch during hard switching is below a predetermined threshold. This thus reduces or eliminates the contribution from the VDC−(VCL++VCL−) term in equation 1.

In some embodiments the effect of the DC voltage component on the director switch of a phase limb undergoing hard switching may additionally be reduced by temporarily reducing the DC voltage itself, i.e. by a reduction of VDC at least during the hard switching. This may enable the voltages of the chain-link(s) to more readily be controlled to compensate for DC voltage.

It will be appreciated however that as the DC voltage is applied to all the phase limbs to change the DC voltage in this way would require co-ordinated action between all the phase limbs. Such an approach would clearly have an impact on the DC system connected to the VSC but this may actually help reduce distortion in the AC system.

In some embodiments the chain-link voltages can additionally or alternatively be controlled so as to reduce the impact of the voltages induced in the arm inductances due to the current ramp, i.e. to reduce or eliminates the contribution from the (LARM++LARM−)·IP/tfall term in equation 1.

Thus in some embodiments the voltage of the high side and low side chain-links may be controlled according to:

$$(VCL++VCL-)=VDC+(LARM++LARM-)\cdot IP/\text{tfall} \qquad \text{Eqn. (3)}$$

The value of the arm inductances of the phase limb will be known. Likewise the DC voltage at the time of hard switching will be known. The phase current will typically be monitored as part of the VSC control and thus this value will be available and the value tfall will be a characteristic value that could previously have been measured or modelled.

If the chain-link voltages were controlled to provide such a combined voltage then not only would the DC voltage component across the director switch be cancelled but the chain-link voltages would also compensate for the induced voltages in the arm inductances and thus there would be substantially no voltage across the director switch during the hard switching event.

However in order to ensure that there is no voltage stress across the director switch the chain-link voltages should be controlled to add a component intended to compensate for the induced voltages just for the period when such voltages are induced. If this voltage is applied for too a short time, a high voltage will be seen across the switching elements of the director switch for at least some time during the current ramping period, for instance if the compensating voltage is prematurely removed. If the voltage were instead applied for too long, a high circulation current, in the direction of ISW in FIG. 2 would be produced.

The embodiments discussed so far have focussed on controlling the voltages of the chain-links to reduce the voltage stress across a director switch during hard switching by providing voltages that compensate for at least some of the voltages that develop across a director switch during the hard switching.

In some embodiments the chain-link circuits may additionally or alternatively be controlled in a hard switching event so as to control, at any point in the phase cycle, the current through the director switch to be below a predetermined threshold. In other words the chain-links may be switched so as to force the arm current to be no greater than a predetermined level, for example substantially zero, before the director switch is opened.

Figure 6:
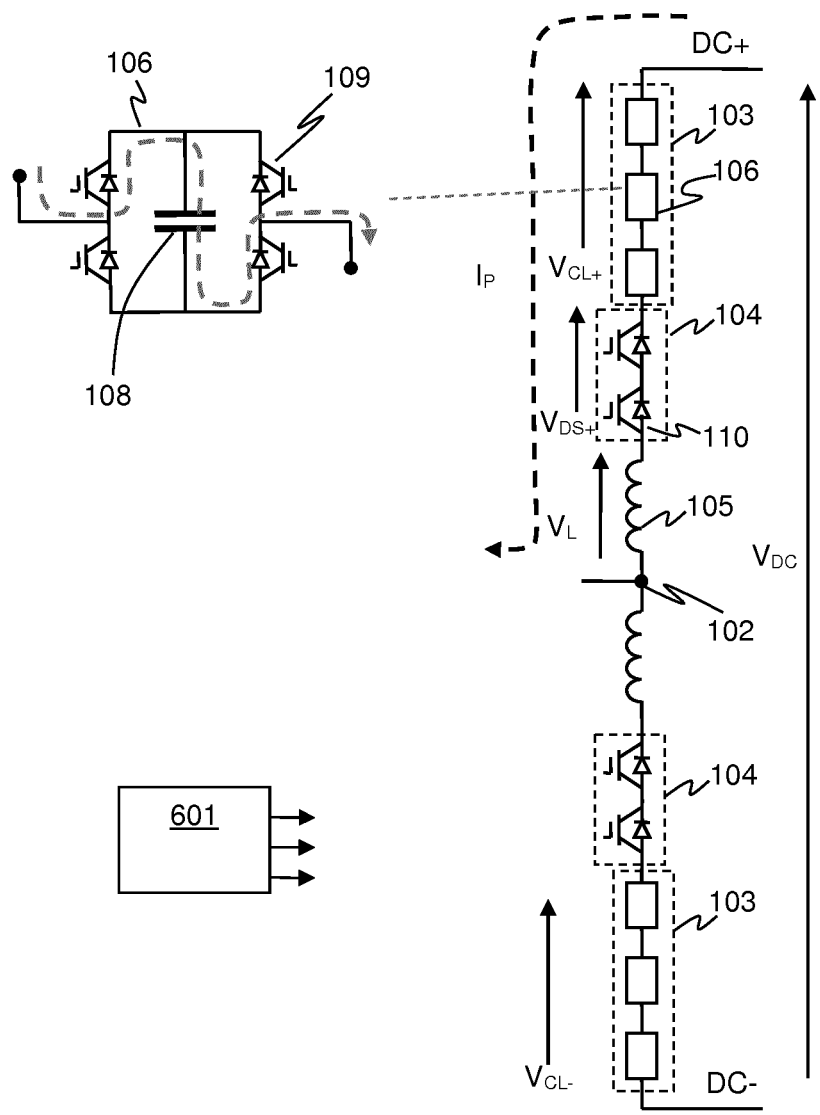
FIG. 6 illustrates the control of chain-links of a phase limb during hard switching according to another embodiment of the invention.

In such embodiments the chain-links may be blocked to drive the arm current to zero (or some minimum value) before the associated director switch is opened as illustrated in FIG. 6. Each cell 106 of the chain-link 103 may therefore be switched, e.g. by a controller 601, so that all the cell switching elements 109 of the cell are turned off. The phase current IP will thus be forced to flow via the free-wheeling diodes of the cells 106 in a path that would result in charging of the cell capacitor 108, as indicated by the grey dotted line. The cell capacitors are relatively large, for instance they may have capacitances of the order of a few milifarads or so, and in this state the cell capacitors can thus absorb the inductive energy without any undue increase in voltage.

This approach uses the chain-link voltages to effectively reverse the voltage across the arm inductances and therefore drive the arm current to zero. It has the advantage that in the blocked state, the chain-link cells receive a current that is in a direction that charges the cell capacitors. Such charging may be used to increase the overall voltage available from the blocked chain-link cells and therefore enhance the current extinction process. The final result of this strategy may be similar to that obtained with the previously explained strategies, shown in FIG. 4 and FIG. 5, but done in a relatively more crude way.

Once the current in the converter arm has reached zero (or its minimum value), the director switch can be opened. In this case when the director switch opens there is no significant current flowing in the converter arm and thus no ramp in current associated with the director switch opening. As such there is no significant induced voltage across the director switch.

In some embodiments the chain-link cells 103 may thus be switched to a blocked state, prior to opening the director switch, in order to drive the arm current to zero, or some suitably low value. Once this current value is reached the voltage of the chain-link may then be switched so that the combined chain-link voltage equals the DC voltage, as described above, so as to cancel any DC voltage component across the director switch as it opens.

In some embodiments however the chain-link may be switched to a blocked state and the director switch opened without waiting for the arm current to drop to some predetermined value. By switching to the blocked state the DC voltage across the director switch will drop to substantially zero as described above and thus switching the chain-links to a blocked state represents another way to ensure that the DC voltage across the director switch is below a predetermined level before the director switch is opened.

In some embodiments where a chain-link is switched into a blocked state, whether or not the director switch is opened straight afterwards or only after the arm current has dropped to a predetermined level, the chain-link may be controlled so that only some of the cells of the chain-link are switched to a blocked cell state. Depending on the operating point of the phase limb at the point that the hard switching event occurs, e.g. the present DC level and/or point in the phase cycle, it may be sufficient to switch only some of the cells of the chain-link to a blocked cell state to provide cancel the DC voltage component and/or drive the arm current down towards zero. As used herein the term blocked state in relation to a chain-link shall therefore refer to switching at least some cells into a cell blocked state, e.g. a sufficient number of cells of the chain-link to drive the voltage to the predetermined level and/or reduce the DC voltage component across the director switch when it opens to below the predetermined level.

As mentioned therefore the chain-link(s) may be switched into a blocked state so as to reduce the arm current to be no greater than the predetermined limit before the director switch is opened. It would alternatively be possible to control the arm current by control of the voltages of the chain-links. Thus in some embodiments in a hard switching event the chain-link circuits may not be switched to a blocked state but may be controlled to provide a voltage level that acts to reduce the arm current. This voltage state may be maintained until the arm current has dropped to the predetermined limit, which may be substantially zero, at which point the director switch may be opened. At this point as the director switch is opened the effect of any induced voltage in the arm inductances is relatively limited. As with the embodiment discussed above which uses a blocked chain-link state to reduce the arm current, after the arm current has dropped to the pre-determined level the voltages of the chain-links may be switched to jointly equal the DC voltage so that there is no DC voltage component across the director switch as it opens.

Figure 7:
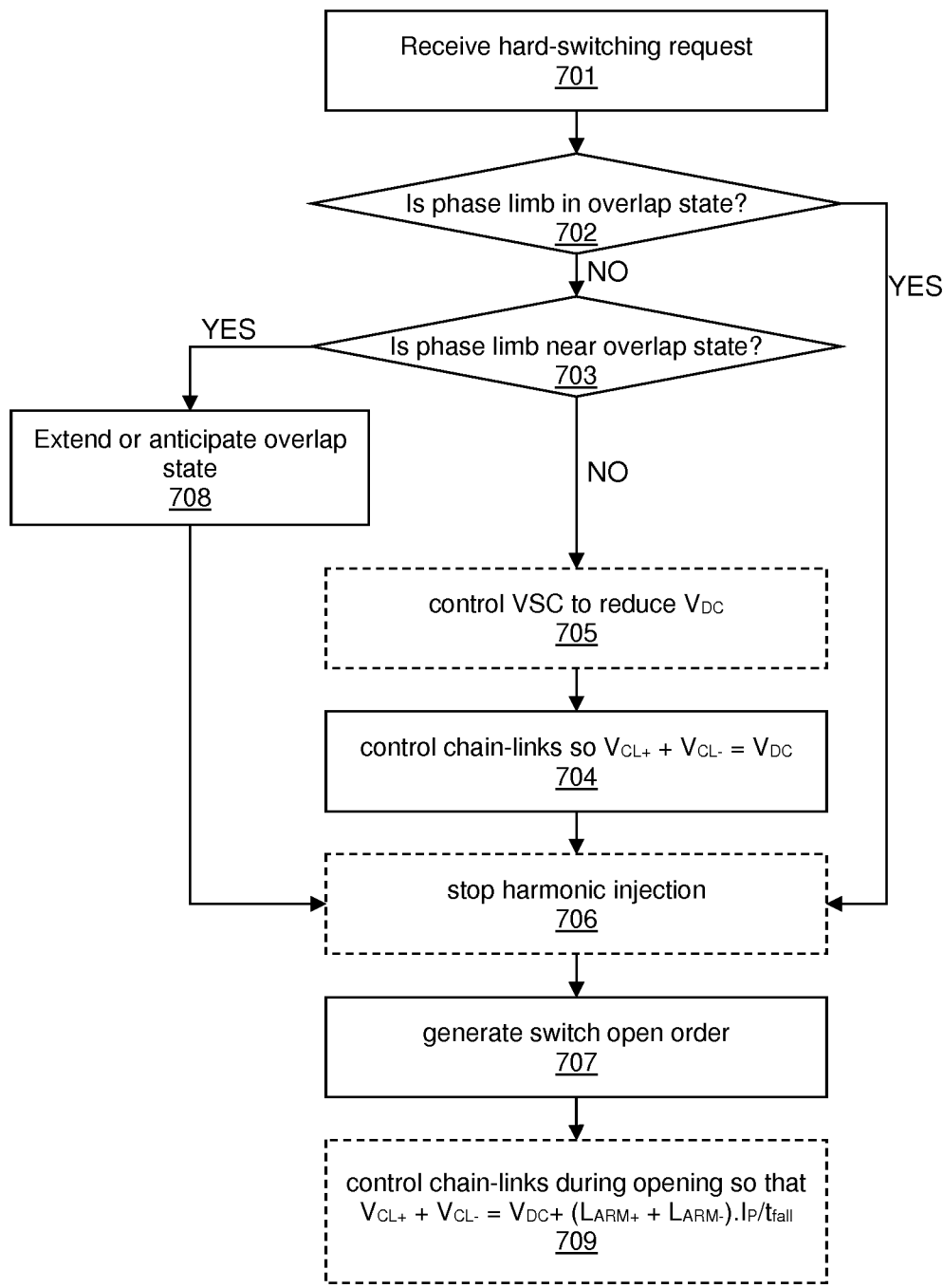
FIG. 7 shows a flow-chart illustrating a method of controlling a VSC during hard switching according to an embodiment.

Embodiments of the present invention may be implemented by a suitable VSC controller, such as the controller 601 illustrated in FIG. 6. The VSC controller may be implemented by hardware or software or a combination of the two. The components of the controller may be the same as a conventional controller for controlling operation of the VSC but configured to implement one or more of the embodiments described above. FIG. 7 illustrates an example of one method of control that may be applied. At step 701 a hard switching request is received. The hard switching request is generated in response to determining the need for hard-switching, e.g. due to a grid fault or the like. The circumstances requiring hard switching are varied and one skilled in the art would be well aware with how to determine the need for hard switching and generate a hard switching request. Note that the hard switching request could be generated by a suitable module or the controller itself and receiving the request could comprise reading a status flag or the like. However the request is generated the controller then moves to act on such a request.

At step 702 the controller may determine whether the relevant phase limb will be in an overlap state when the hard switching is required. If the phase limb will not be in an overlap state the controller may determine whether the phase limb will be near an overlap state, i.e. within a certain defined time period of an overlap state ending or starting.

If the phase limb is not in or near an overlap state then the chain-link voltages may be controlled in step 704 to ensure that the chain-link voltage equal the DC voltage. Optionally a step 705 may be performed to reduce the DC voltage across the whole VSC. The controller may also optionally stop 706 any harmonic control, such as tripplen injection or similar modulation scheme. The controller may then generate a switch open order for the relevant director switch in step 707.

Were the phase limb in an overlap state then the voltage requirements for the chain-links may already be met and thus the method may proceed straight to generating, at step 707, the switch open order, possibly cancelling any third harmonic generation. If it were determined at step 703 that the phase limb is not or would not be in an overlap period at the time of hard switching, but was close to an overlap period, then the overlap period could be extended or anticipated in step 708.

In some embodiments when the switch open order has been generated the chain-link voltage may be controlled during opening of the director switch to also cancel any induced voltage across the director switch in step 709.

Figure 8:
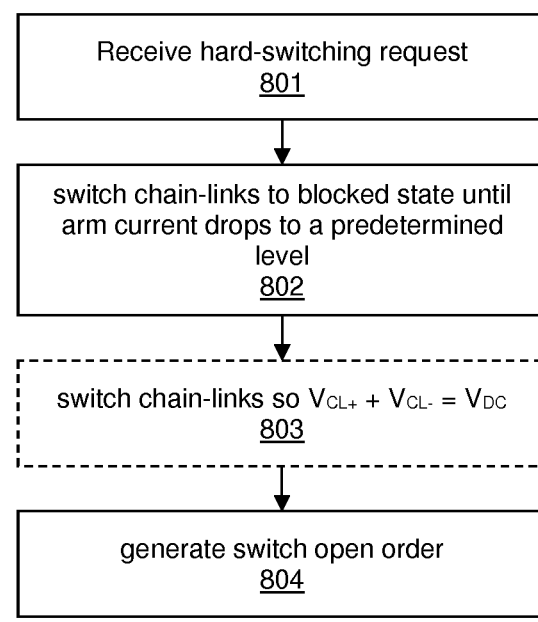
FIG. 8 shows a flow-chart illustrating a method of controlling a VSC during hard switching according to another embodiment.

FIG. 8 shows a flowchart illustrating another example of a method that could be performed by a controller. At step 801 a hard switching request is received. At step 802 the chain-links are controlled to switch to a blocked state until the arm current drops to a predetermined value. Optionally the chain-link voltages may then be controlled in step 803 to ensure that the chain-link voltage equal the DC voltage before the switch open order is issued at step 804.

Embodiments of the invention thus provide methods and apparatus for control of VSCs, and in particular AAC converters, for use in hard switching. Hard switching is a result of an abnormal operating condition and conventionally may be hard on the director switches of a converter arm. The embodiments of the present invention can reduce or eliminate the voltage stresses on a director switch during a hard switching event wherever in the phase cycle the hard switching event occurs.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A voltage source converter, comprising:
 at least one phase limb comprising a high side converter arm connecting an AC terminal to a high side DC terminal and a low side converter arm connecting the AC terminal to a low side DC terminal;
 wherein each of the converter arms comprises a chain-link circuit in series with a director switch;
 wherein each chain-link circuit comprises a plurality of series connected cells that can be controllably switched to generate a controlled voltage across the chain-link circuit; and
 a controller configured to turn-off the director switch of a converter arm that is conducting current in response to a hard-switching request for a first phase limb;
 wherein, in response to the hard-switching request, the controller is configured to control the chain-link circuits of the first phase limb at any point in a phase cycle to control at least one of: a DC voltage across the director switch, and the current flowing through the director switch to a predetermined level before turning the director switch off;
 wherein the controller is configured to control the chain-link circuits such that a combined voltage of the chain-link circuits of the first phase limb is equal to a DC voltage between the high side DC terminal and the low side DC terminal prior to turning the director switch off; and
 wherein the controller is further configured to control the chain-link circuits such that the combined voltage of the chain-link circuits of the first phase limb is stepped up for a period during turn-off of the director switch to at least partly counteract any voltage across the director switch due to induced voltages in inductances of the converter arms of the first phase limb.

2. The voltage source converter as claimed in claim 1 wherein the predetermined level is substantially zero DC voltage and/or substantially zero current.

3. The voltage source converter as claimed in claim 1 wherein the controller is configured to determine whether the first phase limb is in an overlap state with the director switches of both converter arms on and, if the first phase limb is not in an overlap state, to vary the voltage of at least one of the chain-link circuits.

4. The voltage source converter as claimed in claim 3 wherein the controller is configured to determine whether the first phase limb is within a predetermined time or phase angle of an overlap state, and, if so, is configured to control the chain-link circuits to start the overlap state early or extend the overlap state.

5. The voltage source converter as claimed in claim 1 wherein the controller is configured to vary the voltage of the chain-link circuit of the converter arm that is conducting current.

6. The voltage source converter as claimed in claim 1 wherein the controller is further configured to reduce the DC voltage between the high side DC terminal and the low side DC terminal prior to turning the director switch off.

7. The voltage source converter as claimed in claim 1 wherein the combined voltage of the chain-link circuits of the first phase limb is stepped up by an amount corresponding to $(L_{ARM+}+L_{ARM-}) \cdot I_P/t_{fall}$ wherein $L_{ARM+}$ and $L_{ARM-}$ are the inductance values of the high side and low side converter arm inductances respectively, $I_P$ is the current through the converter arm of the first phase limb prior to turning the director switch off and $t_{fall}$ is a predetermined time period related to the turn-off time of the director switch.

8. The voltage source converter as claimed in claim 1 wherein the controller is further configured to vary a modulation scheme for harmonic control prior to turning the director switch off.

9. The voltage source converter as claimed in claim 1 wherein the controller is configured to control the chain-link circuits to block the chain-link circuit in the converter arm that is conducting current before turning the director switch off.

10. The voltage source converter as claimed in claim 1 wherein the controller is configured to control the chain-link circuits to reduce the arm current to the predetermined level before turning the director switch off.

11. The voltage source converter as claimed in claim 10 wherein after the arm current has reached the predetermined level the controller is configured to subsequently control the chain-link circuits such that the combined voltage of the chain-link circuits of the first phase limb is equal to the DC voltage between the high side DC terminal and the low side DC terminal prior to turning the director switch off.

12. A method of controlling a voltage source converter having at least one phase limb comprising a high side converter arm connecting an AC terminal to a high side DC terminal and a low side converter arm connecting the AC terminal to a low side DC terminal; each of the converter arms comprising a chain-link circuit in series with a director switch, wherein each chain-link circuit comprises a plurality of series connected cells that can be controllably switched to generate a controlled voltage across the chain-link circuit; the method comprising:

in response to a hard-switching request for a first phase limb at any point in a phase cycle, controlling the chain-link circuits of the first phase limb to control at least one of: a DC voltage across the director switch, and the current flowing through the director switch to a predetermined level; and subsequently turning the director switch off;

wherein controlling the chain-link circuits of the first phase limb comprises controlling voltages of chain-link circuits such that a combined voltage of the chain-link circuits of the first phase limb is equal to a DC voltage between the high side DC terminal and the low side DC terminal prior to turning the director switch off, wherein the combined voltage of the chain-link circuits of the first phase limb is stepped up for a period during turn-off of the director switch to at least partly counteract any voltage across the director switch due to induced voltages in inductances of the converter arms of the first phase limb.

* * * * *